Sept. 13, 1949.　　　　A. BERTEA　　　　2,481,713
FLEXIBLE SEAL CHECK VALVE
Filed April 30, 1945　　　　　　　　　　2 Sheets-Sheet 1

INVENTOR.
ALEX BERTEA,
BY
ATTORNEY.

Sept. 13, 1949.  A. BERTEA  2,481,713
FLEXIBLE SEAL CHECK VALVE

Filed April 30, 1945  2 Sheets-Sheet 2

INVENTOR.
ALEX BERTEA,
BY
ATTORNEY.

Patented Sept. 13, 1949

2,481,713

UNITED STATES PATENT OFFICE 2,481,713

FLEXIBLE SEAL CHECK VALVE

Alex Bertea, Pasadena, Calif.

Application April 30, 1945, Serial No. 591,142

4 Claims. (Cl. 251—144)

My invention relates to check valves and has particular reference to a check valve provided with a flexible seal for forming a fluid-tight seal with the movable member of the valve.

Check valve structures designed for use in hydraulic and pneumatic systems are required to make a fluid-tight seal in relatively small pressure differences on opposite sides of the movable valve member and considerable difficulty has been encountered in insuring a fluid-tight seal even though the movable valve member and the seating surface against which it is to seal are not only accurately machined but are lapped or otherwise fitted to each other.

It is an object of my invention to provide a valve assembly in which the various parts of the valve may be mass produced and assembled together without requiring any fitting operations of the valve members after assembly.

Another object of my invention is to provide a valve of the character described wherein a relatively thin-walled tubular seal is provided in addition to the seating surface against which the movable valve member seats, the flexible sealing member engaging the movable valve member as it approaches seating position and is flexed by fluid pressure into fluid-tight sealing relation with the movable valve member.

Another object of my invention is to provide a valve structure of the character described which is inexpensive to manufacture.

Other objects and advantages of my invention will be apparent from a study of the following specifications, read in connection with the accompanying drawing, wherein Fig. 1 is a longitudinal sectional view taken through a check valve assembly constructed in accordance with my invention and illustrating the position of the parts when the valve is in closed position;

Figure 1:
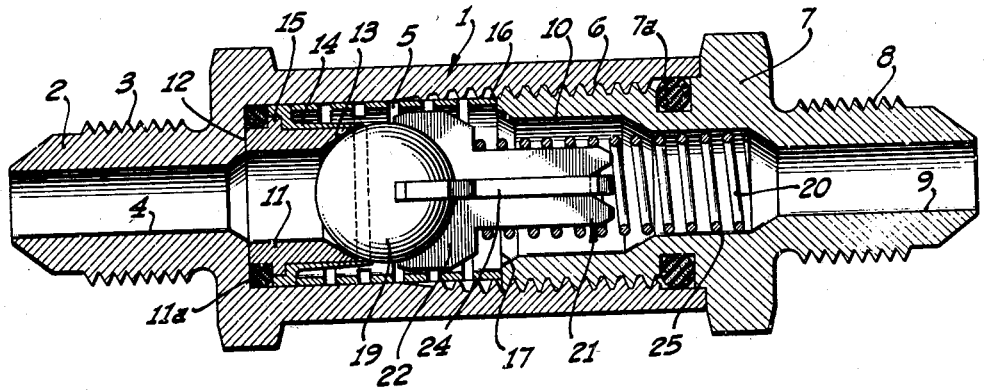
Figure 2:
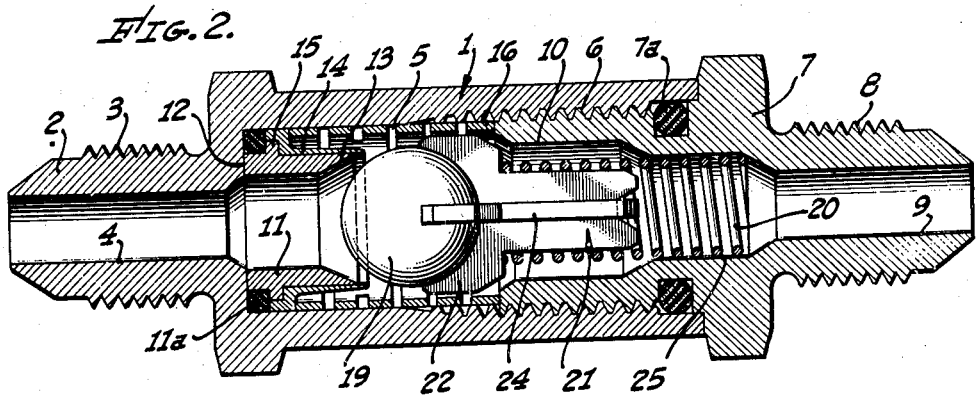
Fig. 2 is a view similar to Fig. 1 and illustrating the position of the parts when the valve is in open position.

Referring to the drawings, I have illustrated in Figs. 1 and 2 a valve assembly which comprises a body member 1, one end of which is formed with an axially extending boss 2 threaded as indicated at 3 for attachment to standard fittings in a hydraulic or pneumatic line. The body 1 is provided with a fluid outlet passage 4 which communicates with an internal bore 5 extending from the end of the body opposite to the coupling boss 2, the bore being threaded at the end opposite the boss as indicated at 6 to threadedly receive a plug member 7 formed with a threaded boss 8 for connection in the hydraulic or pneumatic line and having a fluid inlet passage 9 communicating with an enlarged bore 10.

A valve seat 11 is preferably formed as a separate cylindrical member adapted to seat upon a shoulder 12 formed at the junction between the fluid outlet passage 4 and the body bore 5, the valve seat having a tapered seating surface as indicated at 13.

Figure 3:
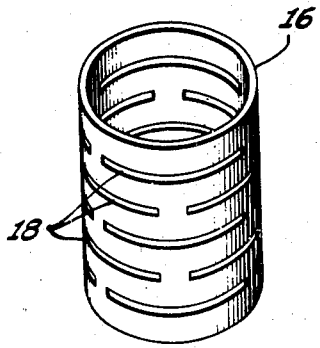
Fig. 3 is a detail perspective view of a spring sleeve employed in the valve construction shown in Figs. 1 and 2.

It will be noted that the external diameter of the valve seat 11 is considerably less than the diameter of the body bore 5 and about the exterior surface of the seat 11 I place a sealing member 14 formed as a hollow tube, the walls of which taper toward the up stream side of the valve to provide a relatively flexible seal projecting slightly beyond the inner edge of the valve seat 11. The seal 14 may be secured in place by any suitable means, one form of which, as illustrated herein, comprising forming an annular rib 15 on the valve seat 11 adapted to bear against a radially extending flange formed upon the outer end of the seal 14. The seal is held in place by means of a spring 16 adapted to have one of its ends bear against the flange of the seal while the other of its ends bears against the end 17 of the plug member 7. The spring 16 may be of any desired construction though I prefer to employ a spring sleeve, as indicated in Figs. 1, 2 and 3, formed from a tube of suitable spring material having staggered transverse cuts 18 formed through the walls of the tube to permit the resilient shortening or lengthening of the tube under pressure.

The movable valve member is preferably constructed as a ball or sphere 19 urged by means of a compression spring 20 into seating relation with the seating surface 13, the diameter of the ball 19 being such that as it approaches said relation upon the seat 11 it will first engage the thin-walled end of the seal 14, the seal being forced by fluid pressure exerted from the up stream side of the assembly into tight sealing relation with the movable valve member, the thin walls of the seal flexing sufficiently to insure fluid-tight sealing relation with the movable valve member irrespective of minor inaccuracies in the machining of the seal, seat and movable valve member.

Figure 4:
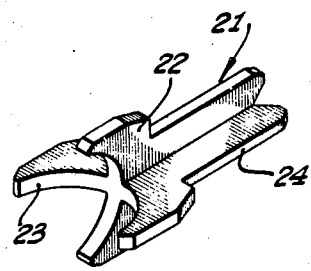
Fig. 4 is a detail perspective view of a guide employed in the assembly shown in Figs. 1 and 2.

To guide the movable valve member in its movements toward and away from the seat, I provide a cage member 21 having a shape illustrated particularly in Fig. 4 as a piece of metal having four radially extending arms 22 providing a substantially cross-shaped transverse cross section, the inner ends of each of the arms being curved as indicated at 23 upon a radius equal to the radius of the ball 19. The outer ends of the arms 22 are reduced in width as indicated at 24 to be received within the coils of the spring 20.

By referring particularly to Figs. 1 and 2, it will be noted that a portion of the bore in the plug member 7 is of reduced diameter, as indicated at 25, this reduced diameter being substantially equal to the external diameter of the helical spring 20 so that the effect of the spring and cage assembly is to flexibly guide the ball 19 in its movements toward and away from the valve seat 11.

In order to maintain a fluid-tight seal between the valve body 1 and the plug 7, an O-ring seal 7a may be employed in an annular groove formed about a part of the plug 7 which projects within the body 1. Likewise a seal may be readily provided between the valve seat 11 and seal 14 by disposing an O-ring seal 11a at the up stream end of the valve body bore to bear against the flange 15 and the end of the seal 14.

In the operation of the valve structure thus far described, the fluid pressures exerted on the up stream side of the ball 19 will cause the ball to open to permit flow of fluid in one direction through the valve assembly while when the flow of fluid is stopped the spring 20, in combination with back pressure on the down stream side of the line, will cause the ball to move toward its seat and in so doing the ball will engage the flexible end of the tubular seal 14 prior to coming to rest upon the tapered seating surface 13. The pressure of the fluid on the down stream side of the valve will be exerted upon the external thin walls of the seal 14, causing it to form with the ball a fluid-tight seal free from any substantial leakage. The metal to metal seal provides for great strength at the seal, enabling the valve to withstand back pressures of extremely high value though, as will be observed from an inspection of Figs. 1 and 2, the forces exerted externally of the seal 14 will be resisted by the relatively heavy metal walls of the seat 11, except at the small over-hang of the seal sleeve adjacent its point of contact with the surface of the ball.

Figure 5:
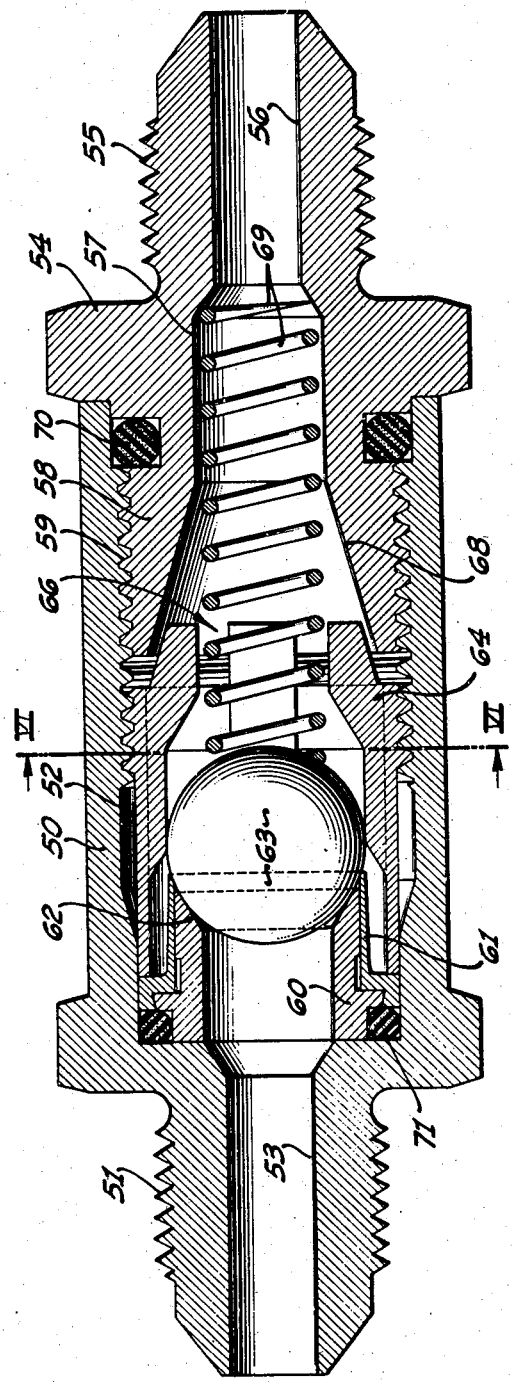
Fig 5 is a longitudinal sectional view of a modified form of valve assembly.
Figure 6:
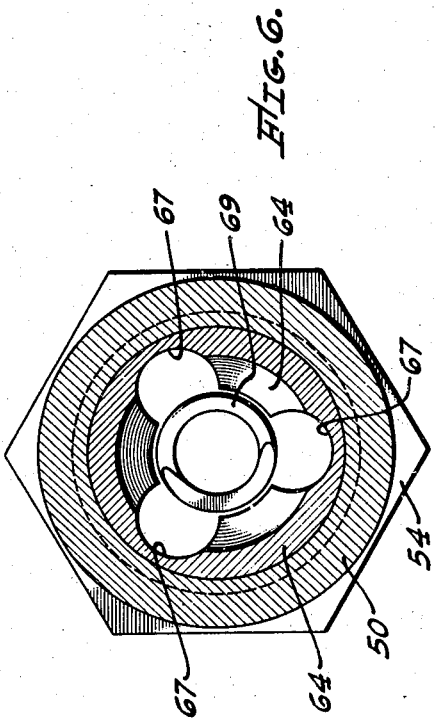
Fig. 6 is a transverse sectional view taken along line VI—VI of Fig. 5.

In Figs. 5 and 6 I have illustrated a somewhat modified form of check valve assembly embodying the same type of metal to metal seal, the form of valve shown in Figs. 5 and 6 including a body 50 having a coupling end 51 and a relatively large diametered longitudinal bore 52 communicating with a fluid inlet passage 53. The plug member 54, like the plug member described with reference to Figs. 1 through 4, is formed with a coupling end 55, a fluid outlet passage 56, which communicates with a longitudinal bore 57 formed upon an inwardly projecting boss 58 which is threaded as indicated at 59 for engagement with and sealing relation to the body 50.

Adjacent the inlet end I mount a valve seat 60 similar to the valve seat 11, the seat 60 being surrounded by a flexible sealing sleeve 61, the thin inner end of which projects beyond or overhangs the end of the seat 60 beyond the tapered seating surface 62 thereof to engage and seal upon a movable ball valve member 63 in the same manner as was described with reference to Figs. 1 through 4.

In this form of valve structure, however, the ball guiding mechanism comprises a cage 64 having a relatively large longitudinal bore 66 extending therethrough and about which a plurality of fluid passage bores 67 (see Fig. 6) are formed so as to permit the ready flow of fluid past the ball when the valve is in open position. The bore 57 in the plug 54 is preferably formed with a tapered portion indicated at 68 communicating with a reduced diameter portion adjacent the fluid outlet passage 56, the smaller diameter portion of the bore forming a guide for a helical spring 69, one end of which bears against the ball and urges it toward valve-closing position while the shape given to the bore 57 provides a substantially stream-lined passageway through the valve for permitting the ready flow of fluids therethrough without substantial turbulence.

O-ring seals 70 and 71 may be disposed in positions corresponding to those of seals 7a and 11a described with reference to Figs. 1 through 4 for the purpose of sealing, respectively, between the valve body and plug and the valve seat metal seal and body.

Again it will be noted, as in the form of the invention described in Figs. 1 through 4, that all of the parts may be readily manufactured independently of each other and merely assembled together without the necessity of any further machining operations during or after assembly, the several parts of the assembly adapting themselves to the other parts of the assembly.

By employing the flexible metal seal as described, there is no need for maintaining low tolerances in the manufacturing of the individual parts, the flexing of the seal compensating for any minor inaccuracies in the manufacture of the parts and insuring a strong fluid-tight seal between the valve seat member and the movable member of the valve.

It will be understood that by selecting the strength of the springs 20 and 69 the fluid pressure differential required to open the valve may be fixed at any desired value, permitting the valve to be adapted to fluid lines and installations over a wide variation of fluid pressures employed in the lines of installations.

While I have shown and described the preferred embodiment of my invention, I do not desire to be limited to any of the details of construction shown and described herein, except as defined in the appended claims.

I claim:

1. In a check valve structure, an elongated valve body, coupling means formed upon one end of said valve body for coupling the body to a fluid line, a longitudinal bore extending through said valve body defining a valve chamber within said body, a plug member threaded into said bore and having a coupling member formed thereon for coupling the plug member to the fluid line, a tubular valve seat member disposed in said bore adjacent the up stream end of said bore, a movable valve member disposed in said bore for movement toward and away from said valve seat member, said valve seat member having at least that portion of its external side wall adjacent the movable valve member spaced annularly away from the wall of said valve body bore, a sealing member comprising a thin flexible metal sleeve surrounding said named portion of the wall of said valve seat member, the exterior wall of said sleeve being spaced annularly from the adjacent wall of said bore to subject said sleeve to the effect of fluid pressure on the down stream side of said valve structure, said sleeve projecting toward the movable valve member a short distance beyond the down stream end of the valve seat member to engage and form a fluid-tight seal with said movable valve member prior to the seating of said movable valve member upon said valve seat member, an external radial flange on said valve seat member, a radial flange on said sealing sleeve engaging the seat flange, and spring means interposed between the radial flange of said sealing sleeve and the inner end of said plug for holding said valve seat and sealing sleeve in place within the bore of said body.

2. In a check valve structure, an elongated valve body having a longitudinal bore extending from one of its ends to define a valve chamber therein, a plug threaded into said bore for completing the housing for said valve chamber, a valve seat member disposed in said chamber adjacent the up stream end thereof, a movable valve member in said chamber disposed for movement toward and away from said valve seat member, and resilient means for holding said valve seat member in place and for guiding the movable valve member, comprising a tubular guide surrounding said movable valve member having a plurality of circumferential cuts extending about said tubular guide and spaced longitudinally from each other, the ends of the adjacent cuts being staggered relative to each other to dispose the ends of one cut in longitudinal alignment with that portion of the next adjacent cuts lying between the ends of said next adjacent cuts and having its up stream end engaged with and urging said valve seat member against the stream end of said bore, and having its down stream end contacted by the plug to initially compress it and hold it in the bore.

3. In a check valve structure, a valve body having a longitudinal bore extending through said valve body and defining a valve chamber therein, a plug member threaded into said bore, a tubular valve seat member disposed in said chamber and having an external flange, a movable valve member disposed in said chamber for movement toward and away from said valve, a sleeve disposed about said tubular valve seat member and having an external flange engaging the seat flange and having an end projecting toward the movable valve member a short distance beyond the end of the valve seat member to engage and form a fluid tight seal with said movable valve member, and a spring member disposed in said chamber and contacting said sleeve flange and held therein by said plug member so that the sleeve and the seat member are pressed against one end of said chamber.

4. A check valve for operation in fluid systems utilizing pressures in excess of 1,500 pounds per square inch comprising, a main body having a bore therein communicating with a restricted inlet, a tubular valve seat member disposed in the bore and spaced from the inner walls thereof and terminating in a conical valve seat, a thin flexible metal sleeve surrounding the tubular valve seat and extending into the bore past the conical end of the valve seat member, means for sealing said seat member and said sleeve in said bore, a ball poppet placed within the bore, a spring disposed in the bore for urging the ball toward the valve seat, and a plug member adapted to close the bore and having an outlet passage communicating therewith, the strength of the sleeve being so related to the pressure used that it elastically deforms under system pressure to seal tightly against the seated ball.

ALEX BERTEA.

REFERENCES CITED

The following references are of record in the file of this patent:

UNITED STATES PATENTS

| Number | Name | Date |
|---|---|---|
| 125,371 | Windhausen | Apr. 2, 1872 |
| 1,931,938 | Pippin | Oct. 24, 1933 |
| 1,936,975 | Wasson | Nov. 28, 1933 |
| 2,151,442 | Roberts | Mar. 21, 1939 |
| 2,192,339 | Wilson | Mar. 5, 1940 |
| 2,391,899 | Hobbs | Jan. 1, 1946 |
| 2,392,501 | Pool | Jan. 8, 1946 |

FOREIGN PATENTS

| Number | Country | Date |
|---|---|---|
| 3,150 | Great Britain | Aug. 9, 1878 |
| 12,911 | Great Britain | June 7, 1904 |
| 84,493 | Sweden | Oct. 1, 1935 |